United States Patent [19]

Yamamoto

[11] Patent Number: 5,176,370
[45] Date of Patent: Jan. 5, 1993

[54] TORSION SPRING AND COVER

[75] Inventor: Yoshihiro Yamamoto, Osaka, Japan

[73] Assignee: Dune Co., Ltd., Osaka, Japan

[21] Appl. No.: 629,580

[22] Filed: Dec. 18, 1990

[30] Foreign Application Priority Data

Dec. 21, 1989 [JP] Japan .................................. 1-334290
Sep. 29, 1990 [JP] Japan .................................. 2-261583
Nov. 19, 1990 [JP] Japan .................................. 2-315499

[51] Int. Cl.⁵ .............................................. F16F 1/14
[52] U.S. Cl. ................................. 267/154; 267/273; 267/279; 280/723
[58] Field of Search .............. 267/273, 277, 279, 280, 267/281, 282, 154; 280/700, 723

[56] References Cited

U.S. PATENT DOCUMENTS

| | | | |
|---|---|---|---|
| 2,606,759 | 8/1952 | Colby .................................. | 280/723 |
| 2,702,701 | 2/1955 | Thorne et al. ...................... | 267/273 |
| 3,131,554 | 5/1964 | Hornschuch et al. ............. | 267/154 X |
| 4,634,108 | 1/1987 | Munch ................................ | 267/279 |
| 4,659,069 | 4/1987 | Odobasic ........................... | 257/280 |

FOREIGN PATENT DOCUMENTS

| | | |
|---|---|---|
| 56-4908 | 6/1979 | Japan . |
| 57-35530 | 8/1980 | Japan . |
| 0013147 | 1/1984 | Japan .................................. 267/154 |
| 59-102413 | 7/1984 | Japan . |
| 59-102414 | 7/1984 | Japan . |

Primary Examiner—Matthew C. Graham
Attorney, Agent, or Firm—William L. Klima

[57] ABSTRACT

A suspension device for an automobile with stoppers that are protrudingly provided in an intermediate portion of a torsion bar, and stopper bearings provided on the inner surface of a cover mounted on the torsion bar to be in contact with the stoppers when the torsion bar is twisted by a prescribed amount, thereby changing the spring constant when the stoppers come into contact with the stopper bearings, while a portion between an engaging portion and the stoppers is rendered smaller in thickness than the remaining portion between the engaging portion and an end provided with no stoppers, thereby providing an increased spring constant. The position of engagement between the cover and the engaging portion is rendered adjustable along the torsional direction, to harmonize comfortableness and operation stability of the automobile.

19 Claims, 5 Drawing Sheets

TORSION SPRING AND COVER

BACKGROUND OF THE INVENTION

1. Field of the Invention

The present invention relates to a suspension device for an automobile employing a torsion bar which utilizes a bar torque, and more particularly, it relates to a suspension device comprising a torsion bar which has a function of varying its spring constant with a load.

2. Description of the Background Art

In general, a torsion bar which is employed in a suspension device for an automobile has a fixed spring constant. An automobile which is provided with a torsion bar having a small spring constant is comfortable to ride in when the same is empty or driven on a flat road with application of a small load. However, when such an automobile is significantly loaded or driven on an irregular road and the load applied thereto is increased, its operational stability is deteriorated. On the other hand, an automobile which is provided with a torsion bar having a large spring constant is uncomfortable to ride in although the same has high operational stability.

To this end, there have been proposed some torsion bars which can vary spring constants to be increased/decreased with loads.

Japanese Utility Model Laying-Open Gazette No. 57-35530 (hereinafter referred to as reference 1) discloses a torsion bar having a stopper, which projects from an intermediate portion along the axial direction of the torsion bar to be in contact with a stopper bearing provided in a position facing the stopper.

In the torsion bar of reference 1, the stopper bearing is fixed to a portion, such as a car body, other than the torsion bar. When the stopper comes into contact with the stopper bearing, therefore, a portion of the torsion bar between the fixed end and the stopper is so fixed that only the remaining portion, i.e., a portion between the stopper and the free end of the torsion bar, serves as a spring to reduce the effective length of the torsion bar. Thus, the spring constant of the torsion bar is increased.

Japanese Utility Model Laying-Open Gazette No. 59-102413 (hereinafter referred to as reference 2) discloses another type of torsion bar, in which an arm is fixed to an intermediate portion of the torsion bar and an end of the torsion bar is fixed to a part of a suspension arm, while a stopper is provided on another part of the suspension arm, to be in contact with the said arm when the torsion bar is twisted by a prescribed amount.

When the torsion bar of the reference 2 is twisted until the arm comes into contact with the stopper, a portion of the torsion bar between the arm and the end which is fixed to a part of the suspension arm is so fixed that only the remaining portion, i.e., a portion between the arm and the other end of the torsion bar, serves as a spring. Also in this case, the effective length of the torsion bar is so reduced as to increase the spring constant.

Japanese Utility Model Laying-Open Gazette No. 59-102414 (hereinafter referred to as reference 3) discloses a torsion bar assembly formed by combination of a hollow torsion bar and a solid torsion bar which is inserted in the hollow torsion bar. While the torsional amount of the torsion bar assembly is small, only the solid torsion bar serves as a spring. When the torsional amount reaches a prescribed value, on the other hand, the solid torsion bar engages with the hollow torsion bar through engaging portions to effectuate the spring constants of both torsion bars, thereby increasing the spring constant of the overall torsion bar assembly.

Japanese Utility Model Laying-Open Gazette No. 56-4908 (hereinafter referred to as reference 4) discloses not a suspension device itself but a stabilizer having a torsion bar, which is provided with a stopper member in its intermediate portion. One end of the stopper member is fixed to a part of a twisted portion of the torsion bar, and the other end is adapted to engage with the torsion bar in a position separated from the fixed portion at an angle exceeding a prescribed torsional angle of the torsion bar along the torsional direction.

When the torsion bar of the reference 4 engages with the stopper member due to application of a heavy load, the effective length of the torsion bar for serving as a spring is restricted to that of the portion other than the stopper member, thereby increasing the spring constant.

In reference 1, the stopper bearing for receiving the stopper, which is provided in the torsion bar, is fixed to the car body etc. In reference 2, on the other hand, the stopper for receiving the arm which is formed in the torsion bar is provided on the suspension arm. These torsion bars cannot change the spring constants by themselves. When these torsion bars are mounted on automobiles, therefore, it is necessary to simultaneously modify parts of the car bodies or the suspension arms in response to the torsion bars. Thus, these torsion bars have no generality as mechanism elements.

The device in reference 3 is complicated in structure since the solid torsion bar is assembled into the hollow torsion bar. Further, a section of a small spring constant, i.e., a section in which only the solid torsion bar serves as a spring, is restricted to such a range that the solid and hollow torsion bars engage with each other in the engaging portions from the separated state. This range is fixed and unchangeable.

The torsion bar of reference 4 must have a spring constant which is horizontally symmetrical with respect to the stopper member since the same forms a stabilizer. Consequently, the torsion bar forming the stabilizer must be uniform in thickness on both sides of the stopper member. Thus, variation of the spring constant is attained only by change in effective length of the torsion bar when the torsion bar engages with the stopper member, and it is difficult to greatly change the spring constant.

Further, it is impossible to displace the stopper member in the torsional direction of the torsion bar since one end of the stopper member is fixed to the torsion bar. Thus, the value of a load causing change in spring constant is rendered constant, and it is impossible to adjust a point of spring constant variation by service conditions such as the type of the automobile, the state of the road and the like.

SUMMARY OF THE INVENTION

An object of the present invention is to provide a suspension device which can change the spring constant of its torsion bar by the torsional amount of the torsion bar itself without modifying a car body, a suspension arm etc., with a large degree of freedom of spring constant variation.

Another object of the present invention is to provide a suspension device which can adjust a point of spring constant variation.

The suspension device according to the present invention comprises a linear torsion bar having an end adapted to be fixed to a car body and another end which is adapted to be coupled to a suspension arm. The inventive suspension device further comprises an engaging portion which is formed in an intermediate portion along the axial direction of the torsion bar, stoppers which are protrudingly formed in a position axially separated from the engaging portion by a prescribed distance, a cover which is located through engagement with the engaging portion for covering the engaging portion and the stoppers, and stopper bearings which are provided in the inner surface of the cover at positions to be in contact with the stoppers when the torsion bar is twisted by a prescribed amount. A portion of the torsion bar between the engaging portion and the stoppers is smaller in thickness than the remaining portion between the engaging portion and an end provided with no such stoppers.

In order to adjust a point of spring constant variation, the cover is adjustably mounted on the torsion bar, so that engagement between the cover and the engaging portion can be adjusted along the torsional direction of the torsion bar. In order to adjust such engagement, the engaging portion between the cover and the torsion bar can be serrated.

While a small load is applied to the suspension device and the torsional amount of the torsional bar is small, the stoppers are not in contact with the stopper bearings and the overall torsion bar serves as a spring. In this case, the portion of the torsion bar between the engaging portion and the stoppers is smaller in thickness than the remaining portion between the engaging portion and the end provided with no stoppers, whereby the smaller portion mainly serves as a torsion bar having a small spring constant.

When a large load is applied to increase the torsional amount of the torsion bar and the stoppers come into contact with the stopper bearings of the cover, on the other hand, the portion of the torsion bar between the engaging portion and the stoppers is fixed by the cover. In this case, the remaining portion of the torsion bar mainly serves as a spring. Since the portion of the torsion bar between the engaging portion and the end provided with no stoppers is larger in thickness than the portion, fixed by the cover, between the engaging portion and the stoppers, the thick portion serves as a spring, thereby increasing the spring constant.

The section in which the stoppers come into contact with the stopper bearings, i.e., the section of a small spring constant, is determined by the angular distances between the stoppers and the stopper bearings along the torsional direction. Thus, it is possible to adjust the section of a small spring constant by adjusting engagement between the cover and the engaging portion.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
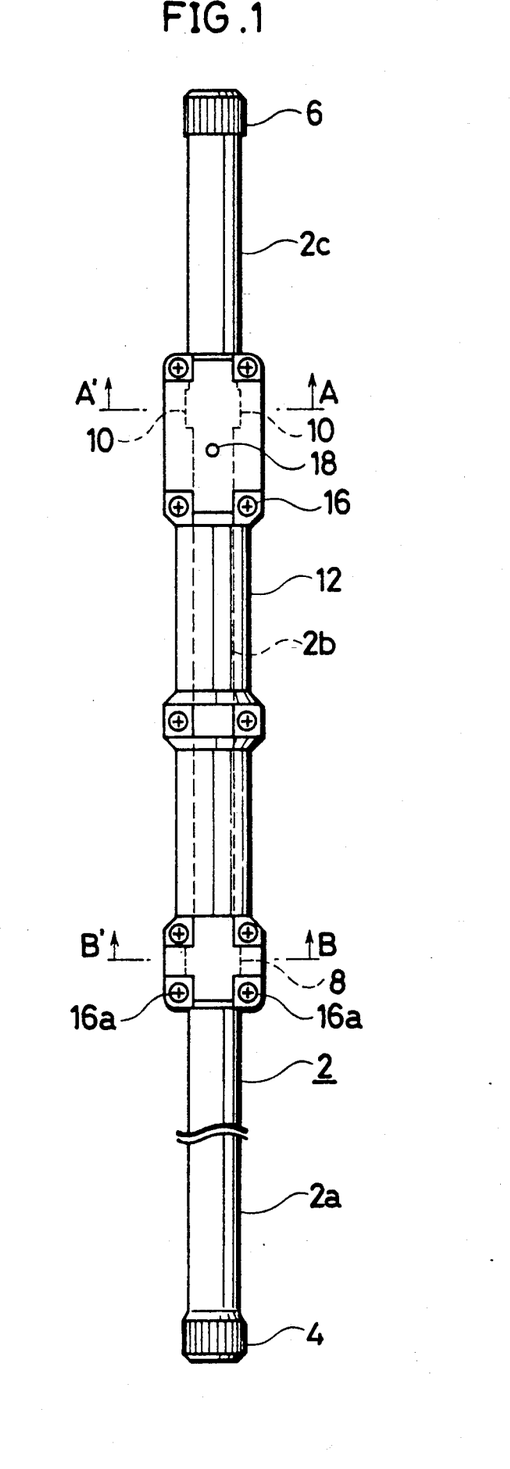
FIG. 1 is a front elevational view showing a torsion bar which is employed in an embodiment of the present invention.
Figure 2:
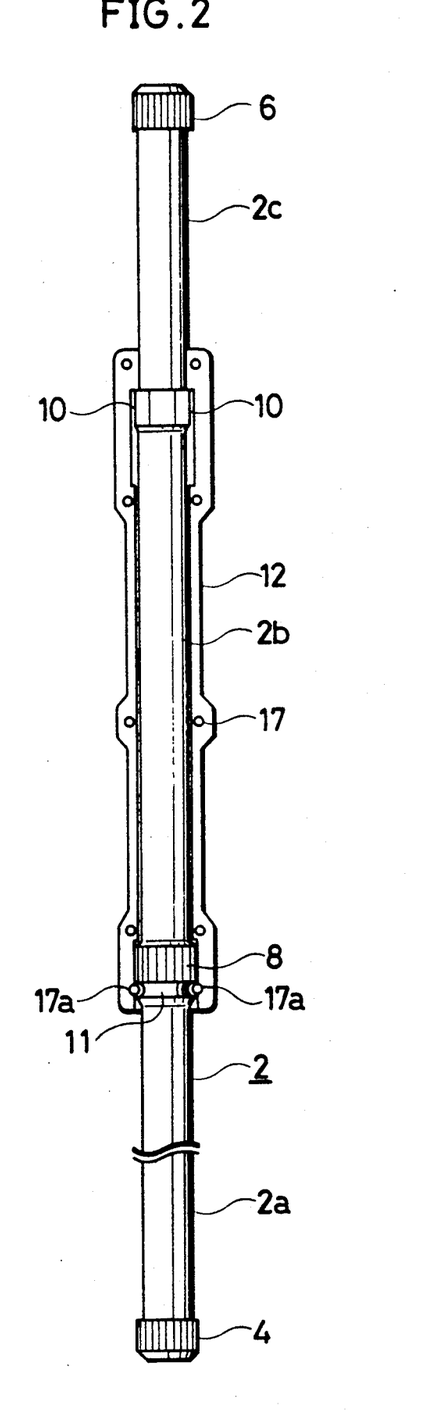
FIG. 2 is a front elevational view showing the torsion bar, from which a cover is removed.
Figure 3:
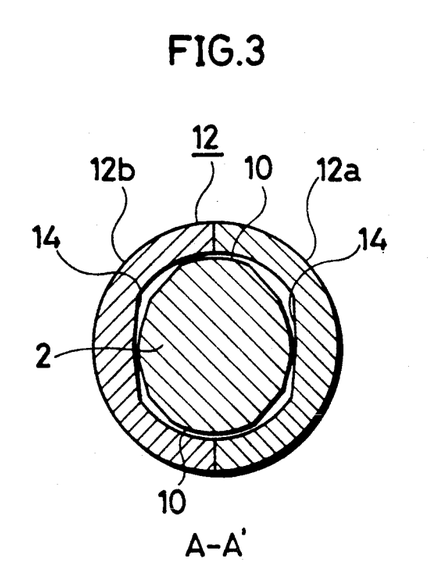
FIG. 3 is a sectional view taken along the line A-A' in FIG. 1.
Figure 4:
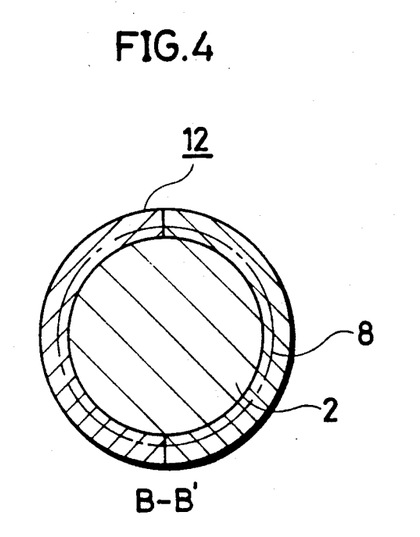
FIG. 4 is a sectional view taken along the line B-B' in FIG. 1.

FIG. 1 illustrates a torsion bar which is employed in an embodiment of the present invention, and FIG. 2 shows the torsion bar from which one side of a cover is removed. FIG. 3 is a sectional view taken along the line A-A' in FIG. 1, and FIG. 4 is a sectional view taken along the line B-B' in FIG. 1.

Numeral 2 denotes a torsion bar, which is in the form of a round bar and provided with serrations 4 and 6 on both end portions thereof. The first serration 6 is fixed to the body of an automobile to serve as a fixed end, and the second serration 4 is mounted on a suspension arm to serve as a free end.

A serration 8 is provided in an intermediate portion of the torsion bar 2, to serve as an engaging portion. A pair of stoppers 10 are protrudingly formed in a portion of the torsion bar 2 located between the serrations 8 and 6 at a prescribed distance from the serration 8. The stoppers 10 are provided on the same circumference in positions symmetrical with respect to the axial center of the torsion bar 2.

The torsion bar 2 is divided into three portions 2a, 2b and 2c by the serration 8 and the stoppers 10.

A groove 11 for axially positioning a cover 12 is provided on the portion 2a of the torsion bar 2 in a position close to the serration 8.

The cover 12 is provided in dimensions for covering a region extending over the serration 8, which serves as an engaging portion, the portion 2b of the torsion bar 2, and the stoppers 10. The cover 12 is provided with a serration in a position of its inner surface facing the serration 8. This serration engages with the serration 8, in order to position the cover 12. In the inner surface of a portion of the cover 12 covering the stoppers 10, a pair of stopper bearings 14 are formed in positions symmetrical with respect to the axial center of the torsion bar 2. The cover 12 is so circumferentially positioned that the stoppers 10 are separated from the stopper bearings 14 in an untwisted state of the torsion bar 2 while the stoppers 10 come into contact with the stopper bearings 14 when the torsion bar 2 is twisted by a prescribed angle. The serration provided in the cover 12 engages with the serration 8 of the torsion bar 2, so that the cover 12 is mounted on the torsion bar 2 by bolts 16 and 16a which are inserted in boltholes 17 and 17a.

While the cover 12 is provided with ten boltholes 17 and 17a, for example, the two boltholes 17a provided in the vicinity of the positioning groove 11 are adapted to axially position the cover 12 and the torsion bar 2 through the bolts 16a received therein, and the remaining boltholes 17 are simply adapted to assemble the cover 12.

Figure 5:
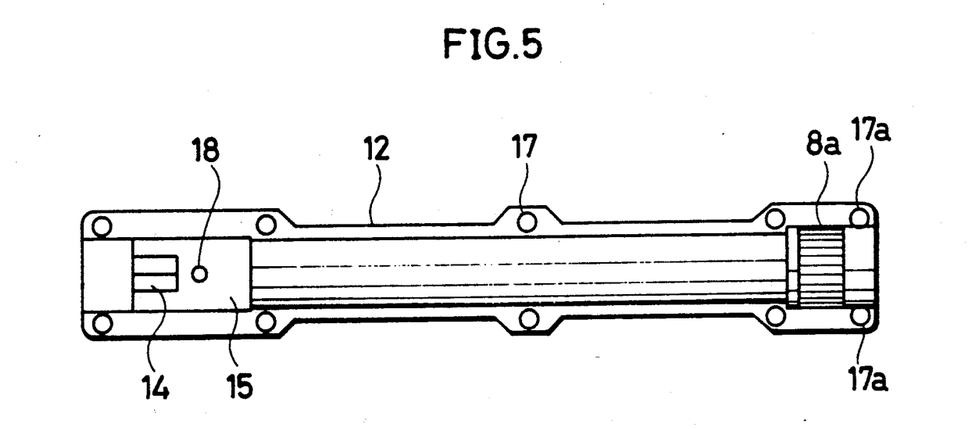
FIG. 5 is an inner plan view showing an exemplary cover.

A region 15 covering the stoppers 10 in the inner surface of the cover 12 is axially broadened as shown in FIG. 5, so that the torsion bar 2 is axially slidable relatively with respect to the cover 12. Further, a grease nipple 18 is defined in this region 15 for supplying grease.

The stoppers 10 and the stopper bearings 14 are provided with contact surfaces, so that the same are in surface contact with each other when the stoppers 10 come into contact with the stopper bearings 14. The contact surfaces of the stoppers 10 have shallow inclinations with respect to the surface of the torsion bar 2. If such inclinations are steep similarly to the stopper member of the reference 4, the durability of the torsion bar 2 is deteriorated.

Figure 6:
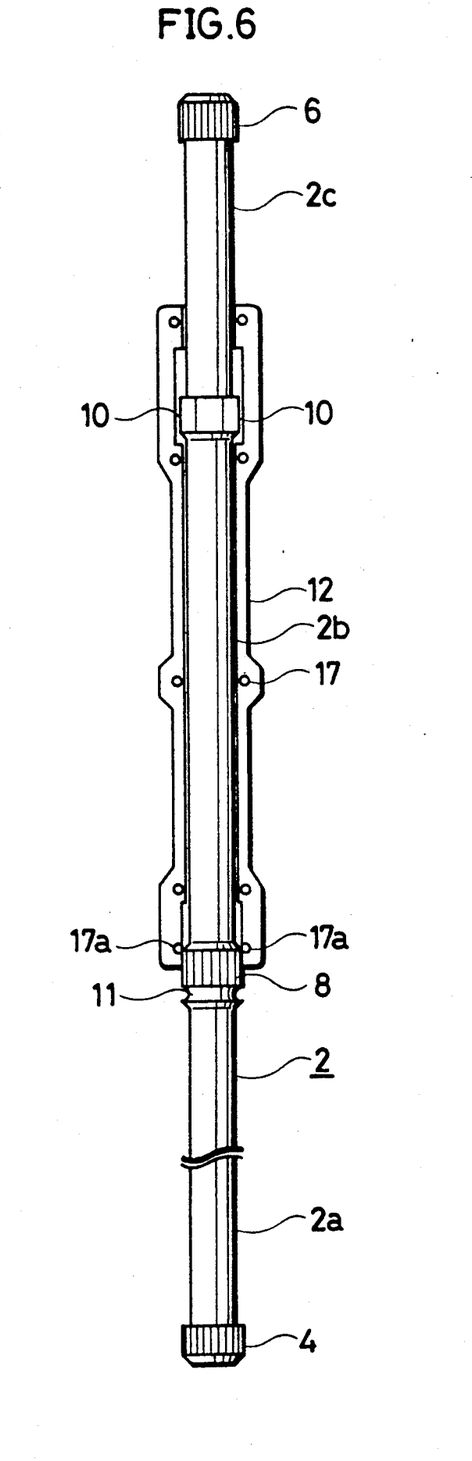
FIG. 6 is a front elevational view showing the torsion bar slid with respect to a cover, from which the cover is removed.

The cover 12 is formed by axially divided halves 12a and 12b, which are combined with each other by the bolts 16 and 16a. When the two bolts 16a for axial positioning are removed, the torsion bar 2 and the cover 12 can be slid in the axial direction, as shown in FIG. 6.

The torsion bar 2 is in the form of a round bar. The portion 2b is smaller in thickness than the portions 2a and 2c, which are identical in thickness to each other. For example, the portions 2a and 2c are 27 mm, and the portion 2b is 23 mm in diameter. As to the length, the portion 2a is 742 mm, the portion 2b is 272 mm and the portion 2c is 137 mm, for example. On the other hand, the serrations 4, 6 and 8 and the stoppers 10 are 20 mm in width, for example. The dimensions of the torsion bar 2 may be set in response to its application, the type of an automobile to which the same is applied, and the like.

Figure 7:
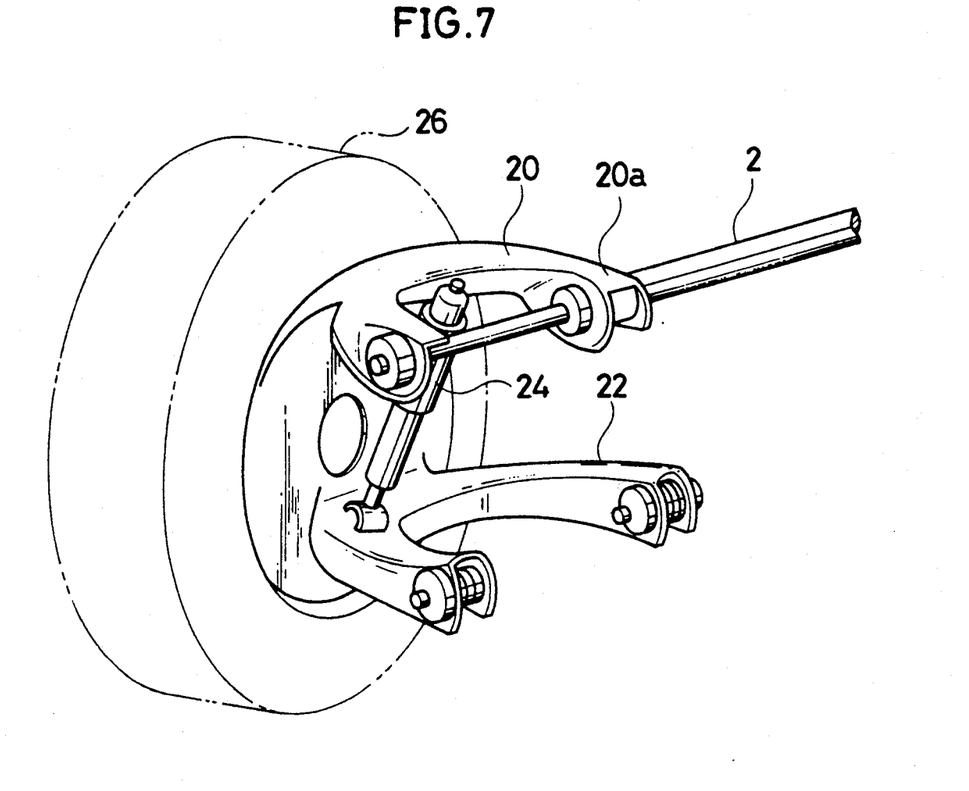
FIG. 7 is a sectional view showing a part of the embodiment.

FIG. 7 shows an embodiment in which the above torsion bar 2 is mounted on a suspension arm of an automobile.

Numeral 20 denotes an upper arm of a double wishbone type front suspension arm, numeral 22 denotes a lower arm thereof, numeral 24 denotes a damper, and numeral 26 denotes a tire which is rotatably supported by the suspension arm 20. The torsion bar 2 is fixed to a part 20a of the upper arm 20 through the serration 4 which is provided on one end thereof, while the other end is fixed to the car body through the serration 6.

The operation of this embodiment is now described.

The torsion bar portions 2a and 2c have larger spring constant values since the same are larger in thickness, while the torsion bar portion 2b has a smaller spring constant value since the same is smaller in thickness.

The automobile is comfortable to ride in when the same is driven on a flat road with a small load, since the stoppers 10 are not in contact with the stopper bearings 14 and the portion 2b having a smaller spring constant value mainly serves as a spring.

When the automobile is driven on an irregular road such as a mountain trail and a heavy load is applied thereto, on the other hand, the stoppers 10 come into contact with the stopper bearings 14. Thus, the portion 2b of the torsion bar 2 is fixed by the cover 12, and provides no function of a spring. In this case, only the portions 2a and 2c serve as a spring. The portion 2c has a larger spring constant than the portion 2a, since the former is shorter than the latter. These portions 2c and 2a serve as a spring, to increase the spring constant of the torsion bar 2.

The portion 2c of the torsion bar 2 may be further reduced in length, to provide no function of a spring.

Figure 8:
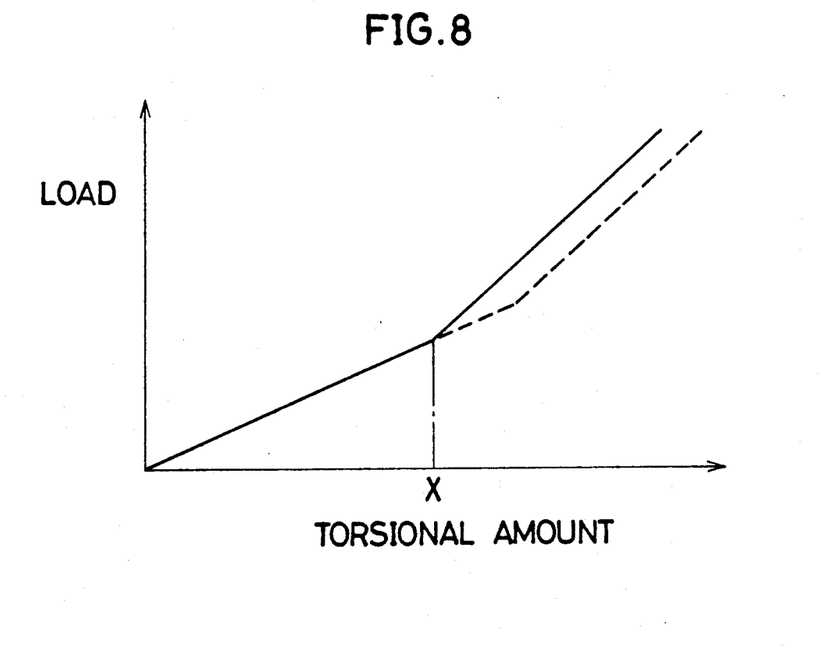
FIG. 8 is a diagram for illustrating the operation of the embodiment.

FIG. 8 is a graph showing relation between the torsional amount of the torsion bar and the load in this embodiment.

Until the torsional amount reaches a prescribed value X, the torsion bar functions with a small spring constant since the stoppers 10 are not in contact with the stopper bearings 14. When the torsional amount reaches the prescribed value X, on the other hand, the stoppers 10 come into contact with the stopper bearings 14 to increase the spring constant. Thus, the spring constant of the inventive torsion bar is changed in two stages. If the cover 12 also serves as a spring, the spring constant shown in FIG. 8 is changed in three stages.

It is possible to adjust the region of a smaller spring constant (section up to the value X in FIG. 8) by detaching the positioning bolts 16a for relatively sliding the torsion bar 2 with respect to the cover 12 and bringing out the serration 8 from the cover 12 as shown in FIG. 6, rotating the torsion bar (or the cover 12) and thereafter sliding the torsion bar 2 (or the cover 12) for axially returning the same to the original axial position but to a different angular position, and tightening the bolts 16a again. Thus, the spring constant is changed as shown by the broken line in FIG. 8, for example, by increasing the angle of rotation to place the stoppers 10 in contact with the stopper bearings 14.

The spring constant can be adjusted also in a state of mounting the torsion bar 2 on the suspension arm, by sliding and rotating the cover 12.

The above embodiment illustrates the serration 8 as an exemplary engaging portion. Although the serration enables fine adjustment, the engaging portion is not restricted to such a serration but may be formed by a member whose section is in the form of a regular polygon such as a square or a hexagon.

While the embodiment comprises only one combination of the engaging portion 8, the stoppers 10 and the cover 12, it is alternatively possible to provide two or more such combinations and change the torsional amount of the torsion bar until the stoppers come into contact with the stopper bearings in the combinations, so that the spring constant of the torsion bar can be changed in at least three stages.

According to the present invention, the stoppers are protrudingly provided in the intermediate portion of the torsion bar while the stopper bearings are provided in the inner surface of the cover which is mounted on the torsion bar to be in contact with the stoppers when the torsion bar is twisted by a prescribed amount, whereby the spring constant is changed when the stoppers come into contact with the stopper bearings. Thus, it is possible to change the spring constant of a single torsion bar in at least two stages. An automobile employing the inventive torsion bar is comfortable to ride in when the same is empty or driven on a flat road since the torsion bar exhibits a small spring constant, while the automobile is improved in operation stability when the same is loaded or driven on an irregular road, since the spring constant of the torsion bar is increased.

According to the present invention, further, the stopper bearings to be in contact with the stoppers are provided on the cover which is mounted on the torsion bar, whereby it is possible to change the spring constant by the torsion bar and its cover alone. Thus, it is possible to mount the inventive torsion bar on an automobile by simply fixing one end to the car body and mounting the other end to a suspension arm, with no necessity for modifying the car body and the suspension arm. Thus, the inventive torsion bar is compatible as a component for different types of automobiles.

Since the portion of the torsion bar between the engaging portion and the stoppers is smaller in thickness than the portion between the engaging portion and the end provided with no stoppers, it is possible to greatly change the spring constant as compared with the case of simply changing the effective length of a torsion bar which is uniform in thickness entirely over the longitudinal direction.

When the contact surfaces of the stoppers are loosely inclined with respect to the surface of the torsion bar, the stoppers are increased in thickness and force is dispersed to improve durability.

Further, the user can freely select the proportion of combination of comfortableness and operation stability of the automobile by adjusting engagement between the cover and the engaging portion. In an automobile which is mainly driven on a flat road, for example, the circumferential distance between the stoppers and the stopper bearings may be increased so that the automobile is comfortable to ride in. When the torsion bar is mounted on a motor truck or an automobile which is mainly driven on an irregular road such as a mountain trail or the like, on the other hand, the circumferential distance between the stoppers and the stopper bearings can be reduced to improve operation stability.

The engaging portion between the cover and the torsion bar may be serrated so that the circumferential distance between the stoppers and the stopper bearings can be finely adjusted.

Engagement at the serrated engaging portions can be smoothly adjusted by relatively sliding the torsion bar with respect to the cover in the axial direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A suspension device for an automobile, comprising:
   a torsion bar including two end portions extending from an intermediate portion, said torsion bar having an end adapted to be coupled to a car body and another end adapted to be coupled to a suspension arm of the automobile, said intermediate portion of said torsion bar having a smaller torsional strength than said end portions of said torsion bar, said torsion bar including;
   an engaging portion provided at said intermediate portion of said torsion bar; and
   a stopper provided at said intermediate portion of said torsion bar at a position axially separated from said engaging portion by a prescribed distance; and
   a cover enclosing said engaging portion and said stopper of said intermediate portion of said torsion bar, said cover cooperating with said engaging portion of said torsion bar to prevent relative rotation therebetween at the position of the engaging portion, said end portions of said torsion bar extending from opposite ends of said cover, said cover including;
   a stopper bearing provided on an inner surface of said cover for cooperating with said stopper of said torsion bar, said stopper being placed in contact with said stopper bearing when said torsion bar is twisted by a prescribed amount within said cover preventing further torsion applied to said intermediate portion of said torsion bar while allowing further torsion load to be applied on at least one of said end portions of said torsion bar.

2. A suspension device in accordance with claim 1, wherein said stopper is provided with contact surfaces which are substantially shallowly inclined with respect to the surface of said torsion bar, and said stopper bearing is provided with contact surfaces to be placed in contact with said contact surfaces of said stopper when said torsion bar is twisted by a prescribed amount within said cover.

3. A suspension device in accordance with claim 1, wherein said cover is adjustably mounted on said torsion bar so that engagement between said cover and said engaging portion can be adjusted in the torsional direction of said torsion bar.

4. A suspension device in accordance with claim 3, wherein engaging portions between said cover and said torsion bar are serrated.

5. A suspension device in accordance with claim 4, wherein said cover and said torsion bar are relatively slidable in the axial direction during an adjustment mode, and a groove for axially positioning said cover relative to said torsion bar is provided on a portion of said torsion bar covered by said cover along the circumferential direction of said torsion bar,
   whereby axial positioning of said cover relative to said torsion bar is provided by bolts installed through said cover into said groove in said torsion bar, and engagement between said cover and said torsion bar is adjusted by extracting said bolts for allowing relative sliding of said torsion bar from said cover, subsequently sliding said torsion bar with respect to said cover to a position disconnecting said serrated engaging portions between said cover and said torsion bar, rotating said cover relative to said torsion bar for adjusting the suspension device, and thereafter sliding said torsion bar with respect to said cover in a direction to a position for reengaging said serrated engaging portions between said cover and said torsion bar and installing and tightening said bolts.

6. A multi-stage torsion bar device, comprising:
   a torsion bar having a pair of torsion bar end portions extending from a torsion bar intermediate portion, said intermediate portion including an engaging portion and a stopper separated apart by a predetermined distance, said intermediate portion having a smaller torsional strength relative to said end portions of said torsion bar; and
   a cover cooperating with said engaging portion and said stopper of said torsion bar, said cover including means for engaging with said engaging portion of said torsion bar to prevent relative rotation therebetween at a position of engagement, said cover including a stopper bearing for cooperating with said stopper of said torsion bar to limit first stage torsional rotation and force applied to said intermediate portion, and transfer and apply second stage torsional force to said end portions of said torsion bar,
   wherein said intermediate portion of said torsion bar couples with said cover during a higher stage loading and acts in unison as a torsion bar and is subject to torsional rotation during the higher stage loading.

7. A device according to claim 6, wherein said torsion bar intermediate portion of said torsion bar is longer relative to either torsion bar end portion of said torsion bar.

8. A device according to claim 6, including means for locating said cover at a substantially fixed lengthwise position on said torsion bar.

9. A device according to claim 8, wherein said means for locating said cover at a substantially fixed position on said torsion bar comprises a peripheral slot provided in said torsion bar cooperating with a bolt extending through said cover.

10. A device according to claim 9, wherein said peripheral groove is provided in said intermediate portion of said torsion bar positioned adjacent to said engaging portion of said torsion bar.

11. A device according to claim 10, wherein said stopper also acts as stop means with said cover for limiting the slidable insertion of said torsion bar into said cover during assembly or after adjustment of the device.

12. A device according to claim 6, wherein an outer periphery of said intermediate portion of said torsion bar is formed with contact surfaces defining said stopper.

13. A device according to claim 12, wherein said contact surfaces have shallow inclinations.

14. A device according to claim 13, wherein said contact surfaces protrude from the surface of said intermediate portion of said torsion bar.

15. A device according to claim 6, wherein at least one of said torsion bar end portions of said torsion bar undergoes substantial torsional rotation during a second stage loading.

16. A device, according to claim 6, wherein said end portions of said torsion bar extend from opposite ends of said cover to allow mechanical coupling with other components for operation of the device.

17. A multi-stage torsion bar device, comprising:
a torsion bar having a pair of torsion bar end portions extending from a torsion bar intermediate portion, said intermediate portion including an engaging portion and a stopper separated apart by a predetermined distance, said intermediate portion having a smaller torsional strength relative to said end portions of said torsion bar;
a cover cooperating with said engaging portion and said stopper of said torsion bar, said cover including means for engaging with said engaging portion of said torsion bar to prevent relative rotation therebetween at a position of engagement, said cover including a stopper bearing for cooperating with said stopper of said torsion bar to limit first stage torsional rotation and force applied to said intermediate portion, and transfer and apply second stage torsional force to said end portions of said torsion bar; and.
locating means for locating said cover at a substantially fixed lengthwise position on said torsion bar, said locating means comprises a peripheral slot provided in said torsion bar cooperating with a bolt extending through said cover.

18. A device according to claim 17, wherein said peripheral groove is provided in said intermediate portion of said torsion bar positioned adjacent to said engaging portion of said torsion bar.

19. A device according to claim 18, wherein said stopper also acts as stop means with said cover for limiting the slidable insertion of said torsion bar into said cover during assembly or after adjustment of the device.

* * * * *